United States Patent
Murphy

(10) Patent No.: US 6,553,943 B1
(45) Date of Patent: Apr. 29, 2003

(54) PET BATHING APPARATUS

(76) Inventor: Gretchen Murphy, 502 5th La., Greenacres, FL (US) 33463-4348

( * ) Notice: Subject to any disclaimer, the term of this patent is extended or adjusted under 35 U.S.C. 154(b) by 0 days.

(21) Appl. No.: 10/178,181

(22) Filed: Jun. 25, 2002

(51) Int. Cl.$^7$ ............................................. A01K 13/00
(52) U.S. Cl. ..................... 119/673; 119/674; 119/69.5
(58) Field of Search ................................. 119/673, 650, 119/665, 674, 675, 676, 652, 69.5, 753, 754, 756, 757, 755; 4/553, 620, 624, 625, 645, 646, 650

(56) References Cited

U.S. PATENT DOCUMENTS

| | | | | |
|---|---|---|---|---|
| 3,170,439 A | * | 2/1965 | Juenger | 119/73 |
| 3,696,786 A | * | 10/1972 | Garwood | 119/69.5 |
| 4,640,226 A | * | 2/1987 | Liff | 119/673 |
| 4,836,144 A | * | 6/1989 | Cole | 119/651 |
| 5,662,069 A | * | 9/1997 | Smith | 119/665 |
| 5,794,570 A | * | 8/1998 | Foster et al. | 119/673 |
| 5,896,595 A | * | 4/1999 | Spencer | 4/519 |
| 5,966,868 A | * | 10/1999 | Cox | 119/69.5 |
| 6,079,951 A | * | 6/2000 | Morton | 119/69.5 |
| 6,269,491 B2 | * | 8/2001 | Zankow | 239/18 |

* cited by examiner

Primary Examiner—Yvonne Abbott
(74) Attorney, Agent, or Firm—Robert M. Downey, P.A.

(57) ABSTRACT

A lightweight and portable pet bathing apparatus for bathing small pets in a bathtub or shower stall includes a bathing platform upon which the pet can stand or sit while being washed. A pedestal structure, including a base and vertical support post, supports the bathing platform at a convenient height which allows a person to stand while bathing the animal. The bathing platform is specifically structured and configured to provide full access to the animal's underside, including the chest, belly and legs, so that the animal can be easily and thoroughly washed and rinsed with the use of a handheld shower nozzle. A drainage system directs water from the bathing platform into the base where it is contained in order to increase the weight of the base, thereby providing greater stability to the apparatus. A plug removes from the base to permit the collected water to drain from the base and into the tub or shower stall after use so that the apparatus can be removed from the tub or shower stall and placed in a closet or other location for storage between use.

9 Claims, 1 Drawing Sheet

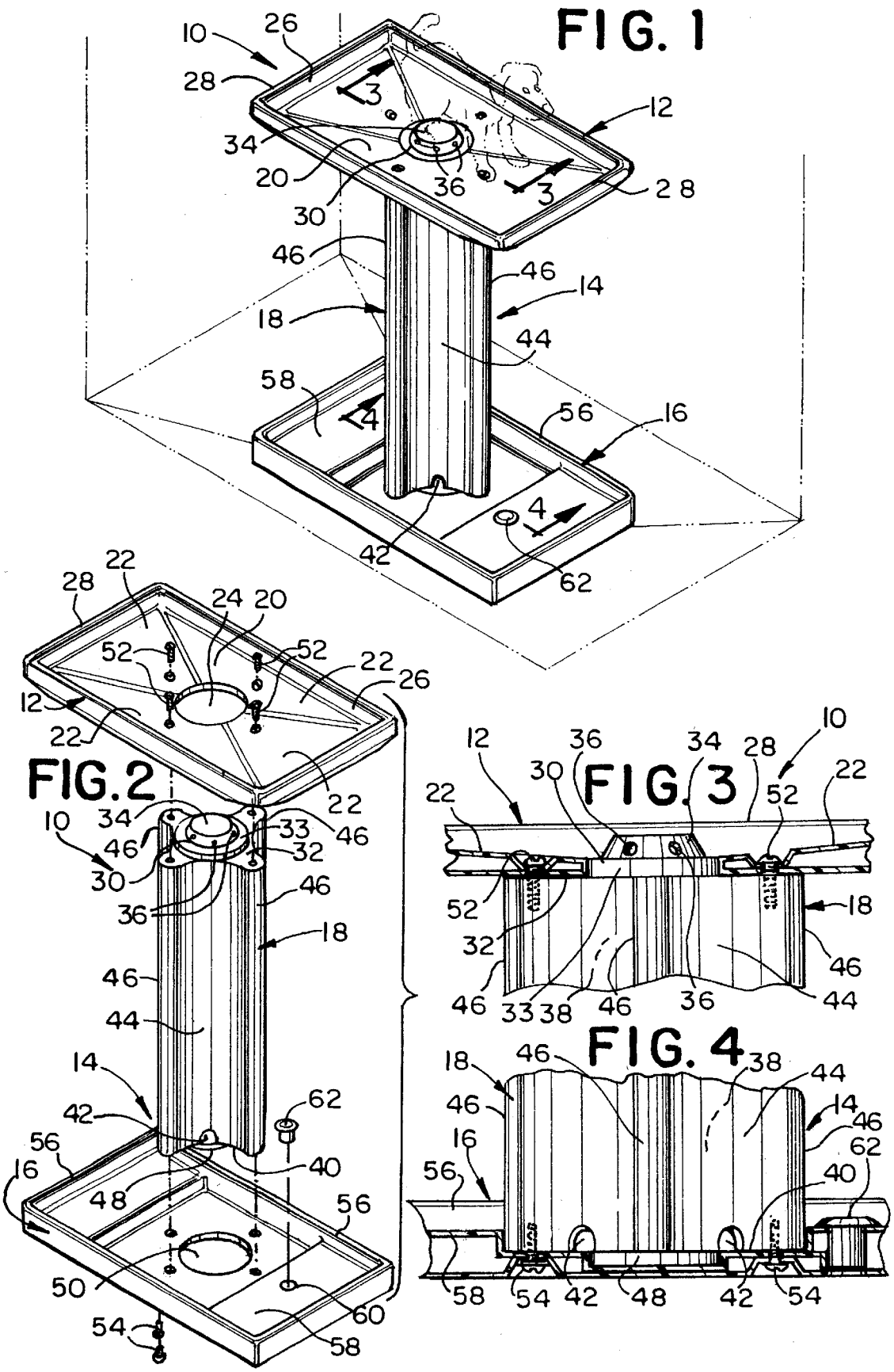

PET BATHING APPARATUS

BACKGROUND OF THE INVENTION

1. Field of the Invention

The present invention relates generally to an apparatus for bathing an animal indoors and, more particularly, to an improved pet bathing apparatus for use in a household bathtub or shower stall for bathing small dogs and other household pets and which provides an elevated bathing platform supported on a pedestal structure having a base which fills with water during use to provide stability.

2. Discussion of the Related Art

Some household pets, and particularly dogs, require bathing at least several times a month. While pet owners may choose to use a commercial pet groomer to have their animal shampooed and trimmed when necessary, these services can be considerably expensive and are not always practical for the typical household budget.

In warmer climates, large dogs are often washed outdoors with the use of a garden hose. However, other pets, including small to medium sized dogs, should not be exposed to the cold temperature of outdoor bathing. And, in cold climates, even large dogs cannot be bathed in this manner. Moreover, pet owners living in apartment and condominium buildings may not have access to an outdoor facility for bathing their pets.

In general, it is preferable to bath dogs and other pets indoors, and particularly in either a bathtub, shower stall or sink. This allows the water temperature to be controlled so that the animal is comfortable and not at risk of becoming ill from exposure to cold water temperatures and the outdoor elements. Bathing a pet indoors also allows the pet owner to maintain better control of the animal.

Despite the benefits of bathing an animal indoors, there are still a number of problems that a pet owner confronts when attempting to bath a dog or other animal in a sink, bathtub or shower stall. Specifically, a sink will only accommodate a small animal and can result in a mess, especially if the animal shakes frequently during the bathing process or attempts to escape. While bathtubs and shower stalls allow the pet owner to better contain the mess, these locations require the pet owner to bend or kneel down when washing the animal. Obviously, this can be uncomfortable and may result in back strain or other injury. A further problem encountered when bathing an animal indoors is the accumulation of hair in the sink or tub drain resulting in clogs and the possible need for plumbing repairs.

In the past, others have proposed various devices for bathing animals indoors. While many of these various prior art devices overcome the above-noted problems, they still present several shortcomings which limit their usefulness and marketability. In particular, the U.S. Patent to Drane, et al., U.S. Pat. No. 5,974,601, discloses a small animal-washing container for bathing small pets in a home bathtub or shower stall. The container assembly includes foldable legs to raise the container to a height that allows a person to stand while administering the bath. However, the folding legs of this device are somewhat clumsy and not always sturdy, particularly when the washing container is used to bath animals weighing in excess of twenty pounds. Specifically, the high center of gravity resulting from the elevated height of the animal in relation to the lightweight foldable legs can cause the container assembly to accidentally topple over, especially if the animal becomes excited and moves anxiously about the container. Also, if the animal moves its weight to either the forward or rear end of the container, the foldable legs can collapse, resulting in possible injury to the animal as well as possibly the person administering the bath.

Another example of an apparatus for washing pets indoors is disclosed in the U.S. Patent to Foster, et al., U.S. Pat. No. 5,794,570. This apparatus includes a substantially large tub which is fastened to a pedestal. A platform is provided for installation in the tub when washing a smaller animal, and a stairway is provided to allow a larger pet to walk up the stairway and into the tub. The apparatus disclosed in this patent is fairly elaborate and, accordingly, would be considerably expensive. Furthermore, the numerous and fairly large and cumbersome components may not fit in some tubs or shower stalls and are not easily stored.

A further drawback of the animal washing apparatuses in U.S. Pat. Nos. 5,974,601 and 5,794,570, as well as other indoor pet bathing devices in the related art is the provision of substantially high sidewalls which surround the bathing container. These sidewalls obstruct access and make it difficult to wash the chest, belly and legs of the animal, particularly when rinsing the shampoo from the animals coat and skin.

Accordingly, there still remains a need in the field of animal grooming for an apparatus which is particularly suited for safely and conveniently supporting an animal at a height which allows a person to stand while administering the bath in a bathtub or shower stall, and wherein the apparatus is further sturdy, lightweight, relatively inexpensive and easy to store.

SUMMARY OF THE INVENTION

The present invention is directed to a lightweight and portable pet bathing apparatus for bathing small pets, including small to medium size dogs, in a bathtub or shower stall. The pet bathing apparatus includes a bathing platform upon which the pet can stand or sit while being bathed. The platform is supported on a pedestal structure which includes a base and a vertical support post. In a preferred embodiment, the pedestal structure supports the bathing platform at a height of between 28 inches and 34 inches above the floor so that the pet is positioned at a convenient height to the person administering the bath. The bathing platform is specifically structured and configured to provide full access to the animal's underside, including the chest, belly and legs, so that the animal can be easily and thoroughly washed and rinsed with the use of a handheld shower nozzle. The top surface of the bathing platform is provided with angled floor surfaces which direct water towards a center drain cap. The drain cap is provided with a plurality of holes communicating with a hollow interior channel of the vertical support post. Drain exit holes at the lower end of the support post allow the drained water to empty into the base. A raised lip about the perimeter of the base contains the water therein, thereby increasing the weight of the base and providing greater stability to the apparatus. A plug removes from the base to permit the collected water to drain from the base and into the tub or shower stall after use so that the apparatus can be rinsed and removed for storage in a closet or other location until the next use.

OBJECTS AND ADVANTAGES OF THE INVENTION

With the foregoing in mind, it is a primary object of the present invention to provide a lightweight and portable pet bathing apparatus which is adapted for use in a bathtub or shower stall, and which is structured to support a pet at a convenient height which allows the person administering the bath to stand comfortably upright.

It is a further object of the present invention to provide a lightweight and portable pet bathing apparatus which is adapted for use in an indoor bathtub or shower stall, thereby allowing the person administering the bath to adjust the water temperature.

It is still a further object of the present invention to provide a lightweight and portable pet bathing apparatus for bathing small pets, and wherein the apparatus includes a bathing platform supported at an elevated height and structured and configured to permit full, unobstructed access to the animal's underside, including the chest, belly and legs, so that the animal can be easily and thoroughly washed and rinsed with the use of a handheld shower nozzle.

It is still a further object of the present invention to provide a lightweight and portable pet bathing apparatus for bathing small pets, and wherein the apparatus includes a bathing platform supported on a pedestal structure including a base and vertical support post, and wherein the apparatus further includes a drainage system which is structured and disposed to direct water into the base which provides greater stability to the apparatus.

It is still a further object of the present invention to provide a lightweight and portable pet bathing apparatus which includes a drainage system which is structured and disposed to direct water into the base for stability, and further wherein the base includes a plug which removes after use to drain water from the base, thereby permitting convenient rinsing and removal of the apparatus from a bathtub or shower stall after use.

It is still a further object of the present invention to provide a lightweight and portable pet bathing apparatus for bathing small pets, and wherein the apparatus is easily stored in a closet when not being used.

These and other objects and advantages of the present invention are more readily apparent with reference to the following detailed description and drawings.

BRIEF DESCRIPTION OF THE DRAWINGS

For a fuller understanding of the nature of the present invention, reference should be made to the following detailed description taken in conjunction with the accompanying drawings in which:

FIG. 1 is a top perspective view showing the pet bathing apparatus of the present invention shown in a shower stall with a small dog standing on the platform, representing a typical example of use of the present invention, and wherein the shower stall and small dog are illustrated in phantom;

FIG. 2 is an exploded view illustrating the principle components of the pet bathing apparatus of the present invention;

FIG. 3 is an isolated cross-sectional view taken along line 3—3 in FIG. 1; and

FIG. 4 is an isolated cross-sectional view taken along the line 4—4 in FIG. 1.

Like reference numerals refer to like parts throughout the several views of the drawings.

DETAILED DESCRIPTION OF THE PREFERRED EMBODIMENT

Referring to FIGS. 1–4, the pet bathing apparatus is shown and is generally indicated as 10. The pet bathing apparatus 10 includes a bathing platform 12 which is structured and disposed for supporting an animal, such as a small to medium sized dog, in a standing or seated position. A pedestal structure 14 supports the bathing platform 12 at a height of between 28 inches and 34 inches above the floor. In a preferred embodiment, the bathing platform is supported at a height of 30 inches above the floor so that the animal being bathed on the platform is positioned at a height that allows the person bathing the animal to stand comfortably in an upright position without bending or straining the back or legs. The pedestal structure 14 comprises a base 16 and a vertical support post or leg 18 which fastens at opposite ends to the base 16 and bathing platform 12 as described more fully hereinafter.

The top side 20 of the bathing platform 12 is provided with sloped floor surfaces 22 which angle downwardly toward a central opening 24, as seen in FIG. 2. The perimeter 26 of the bathing platform is provided with a raised lip 28 which extends about the entire periphery of the bathing platform, above the top side 20. The raised lip 28 and sloped floor surfaces 22 serve to direct water towards the central opening 24, and more particularly towards a drain cap 30 on the top end 32 of the vertical support post 18. It should be noted that the pet bathing apparatus 10 is particularly suited for use within a bathtub or shower stall, and preferably in a bathtub or shower stall which is fitted with an handheld shower head or spray nozzle on a flexible hose. This allows the pet to be thoroughly rinsed both before and after lathering with shampoo. In particular, use of a handheld shower nozzle allows the chest, belly and legs of the pet to be thoroughly rinsed, while avoiding excess water on the ears and eyes of the pet which may cause irritation. Furthermore, use of a handheld shower nozzle in a bathtub or shower stall allows the water to be contained generally to the area of the apparatus, with most of the water being directed onto the pet and top side 20 of the bathing platform 12. In this manner, a mess of the shower stall or tub can be avoided, with most of the animal's shedding hair being contained on the apparatus 10.

As seen in FIG. 2, the bathing platform 12 attaches to the top end 32 of the support post 18 so that an annular flange 33 of the drain cap seats within the central opening 24. A raised central hub 34 of the drain cap is exposed above the top surface of the bathing platform, as best seen in FIG. 3, so that water directed towards the central opening 24 enters drain holes 36 formed in the central hub. The drain holes 36 communicate with a hollow interior 38 of the vertical support post. The hollow interior 38 defines a drainage channel which extends between the drain holes and the bottom end 40 of the vertical support post. Drain exit holes 42 formed in the lower end of the support post wall structure 44 allow the water draining traveling through the hollow interior 38 to exit into the base 16.

The wall structure 44 of the vertical support post 18 is specifically structured and configured to provide strength and rigidity in order to avoid sagging, flexing or bending of the vertical support post which would otherwise compromise the structural integrity and safety of the apparatus. Specifically, the wall structure 44 is shaped and configured to provide longitudinal columns 46 disposed radially outward of the central structure of the support post. The longitudinal columns 46, defining a reinforcing means, provide added rigidity and structural stability to the vertical support post, so that the top platform remains stable without bending, flexing or shaking, even when a dog weighing as much as twenty-five pounds is standing on the bathing platform 12. While dogs weighing more than twenty-five pounds may be washed on the apparatus, it is generally intended that the apparatus be used for bathing small to medium sized dogs or other pets weighing twenty-five pounds or less.

The bottom end 40 of the vertical support post is attached to the base and is provided with an annular stub 48 extending from the bottom end for seating within a congruently configured opening 50 cut in the base floor. As seen in FIG. 2, a plurality of screws 52 are used for fastening the bathing platform 12 to the top end 32 of the vertical support post. Screws 54 extend up through the bottom of the base and fasten the base 12 to the bottom end 40 of the vertical support post.

A raised lip 56 extending about the perimeter of the base 16 is provided for collecting water which drains from the upper bathing platform and out from the drain exit holes 42. The collection of water in the base 16 provides added weight to the base which serves to better stabilize the apparatus by lowering the center of gravity, particularly when an animal in excess of twenty pounds is seated or standing on the bathing platform 12. A water discharge opening 60 is provided in the floor 58 of the base 16 for convenient release of the water which collects in the base, without the need of lifting and tilting the apparatus. A plug 62 is inserted in the discharge opening 60 during use, allowing water to collect in the base. Once the animal has been washed and removed from the bathing platform, the plug 62 can be removed to release the water from the base, prior to rinsing and storage of the apparatus.

While the instant invention has been shown and described in accordance with preferred and practical embodiments thereof, it is recognized that departures from the instant disclosure are contemplated within the spirit and scope of the invention and should not be limited except as set forth in the following claims as interpreted under the doctrine of equivalents.

What is claimed is:

1. An apparatus for bathing a pet in a bathtub or shower stall, said apparatus comprising:
   a platform including a top surface structured and configured for supporting the pet thereon in a standing or seated position and said platform being structured and disposed to permit full, unobstructed access to the pet's underside, including the chest, belly and legs, and said top surface including a plurality of sloped sections angled downwardly toward a central area of said top surface;
   a pedestal structured for supporting said platform at an elevated height which permits a person bathing the pet to stand upright without bending, said pedestal structure comprising:
      a base including a raised lip extending about an outer perimeter to define a reservoir for containing water therein; and
      a vertical support post extending between and connecting to said base and said platform; and
   a drain system for draining water from said top surface of said platform and into said reservoir of said base, said drain system comprising:
      a drain cap positioned at said central area of said top surface and including a plurality of drain holes positioned and disposed for passage of water therethrough;
      at least one drain exit hole at a lower end of said vertical support post and in fluid communication with said reservoir of said base; and
      a channel extending between and communicating with said drain holes of said drain cap and said at least one drain exit hole.

2. The apparatus as recited in claim 1 further comprising:
   a longitudinally extending reinforcing structure for providing strength and rigidity to said vertical support post.

3. The apparatus as recited in claim 2 wherein said longitudinally extending reinforcing structure includes a plurality of longitudinal columns extending along said vertical support post.

4. An apparatus for bathing a pet, said apparatus comprising:
   a base with a raised lip extending about a perimeter thereof to define a reservoir for containing water;
   a platform supported above said base and including a top surface, said platform being structured and disposed for supporting the pet on said top surface;
   a drain system for draining water from said top surface of said platform and into said reservoir of said base, said drain system comprising:
      a drain cap positioned within an area of said platform and including a plurality of drain holes positioned and disposed for draining water from said top surface; and
      a channel extending between and communicating with said drain holes of said drain cap and at least one drain exit hole for directing water into said reservoir in order to fill said reservoir and increase the weight of said base and thereby increasing the stability of the apparatus.

5. The apparatus as recited in claim 4 further comprising:
   a pedestal structure for supporting said platform at an elevated height which permits a person bathing the pet to stand upright without bending, and said pedestal structure including a vertical support post extending between and connecting to said base and said platform.

6. The apparatus as recited in claim 5 wherein said vertical support post includes a longitudinally extending reinforcing structure for providing strength and rigidity to said vertical support post.

7. The apparatus as recited in claim 6 wherein said longitudinally extending reinforcing structure includes a plurality of longitudinal columns extending along said vertical support post.

8. An apparatus for bathing a pet, said apparatus comprising:
   a base with a raised lip extending about a perimeter thereof to define a reservoir for containing water;
   a platform supported above said base and including a top surface, said platform being structured an disposed for supporting the pet on said top surface; a drain system including a plurality of drain holes, said drain system being structured and disposed for draining water from said top surface of said platform and into said reservoir of said base in order to fill said reservoir with water and increase the weight of said base, thereby increasing the stability of the apparatus;
   a pedestal structure for supporting said platform at an elevated height which permits a person bathing the pet to stand upright without bending, and said pedestal structure including a vertical support post extending between and connecting to said base and said platform;

wherein said vertical support post includes a longitudinally extending reinforcing structure for providing strength and rigidity to said vertical support post;

and wherein said longitudinally extending reinforcing structure includes a plurality of longitudinal columns extending along said vertical support post.

9. The apparatus as recited in claim 8 wherein said drain system comprises:

a drain cap positioned within an area of said platform and including said plurality of drain holes positioned and disposed for draining water from said top surface; and a channel extending between and communicating with said drain holes of said drain cap and at least one drain exit hole for directing water into said reservoir.

* * * * *